W. W. STRONG & A. F. NESBIT.
APPARATUS FOR RECTIFYING HIGH POTENTIAL ALTERNATING AND OSCILLATING CURRENTS AND ELECTROMOTIVE FORCES.
APPLICATION FILED JUNE 3, 1913.
1,259,160.
Patented Mar. 12, 1918.
4 SHEETS—SHEET 3.
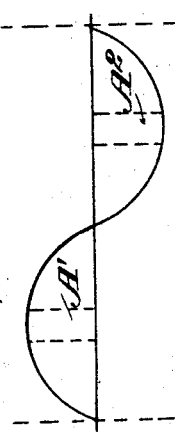
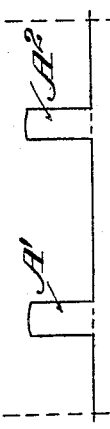
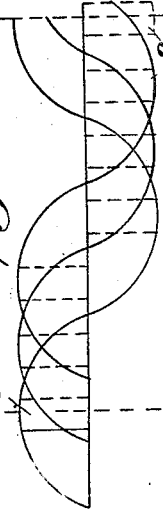
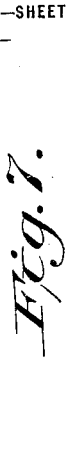
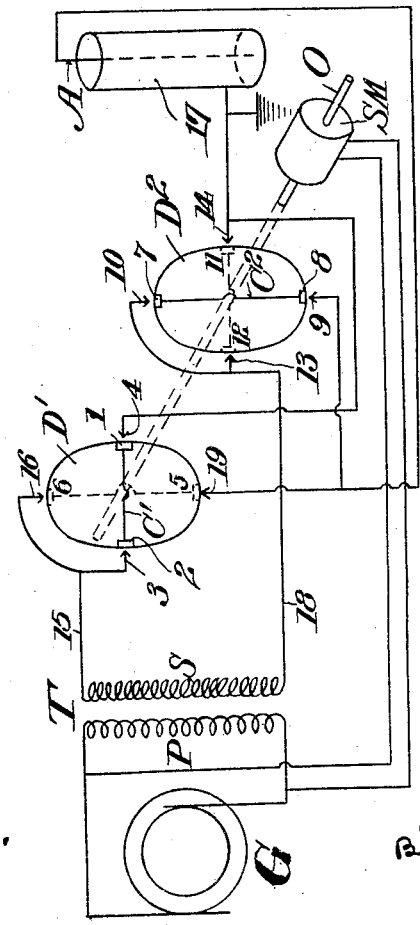
WITNESSES
INVENTOR

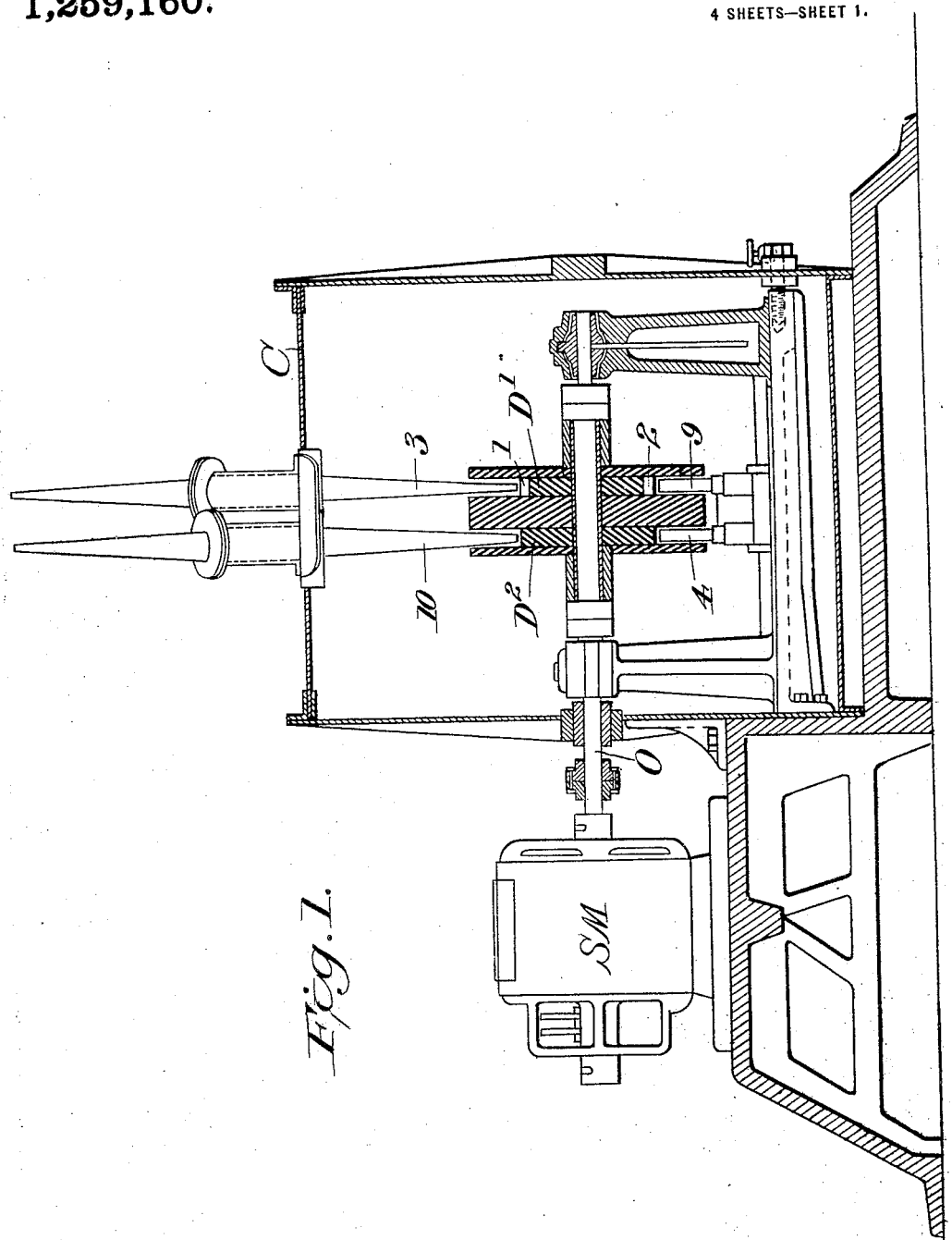

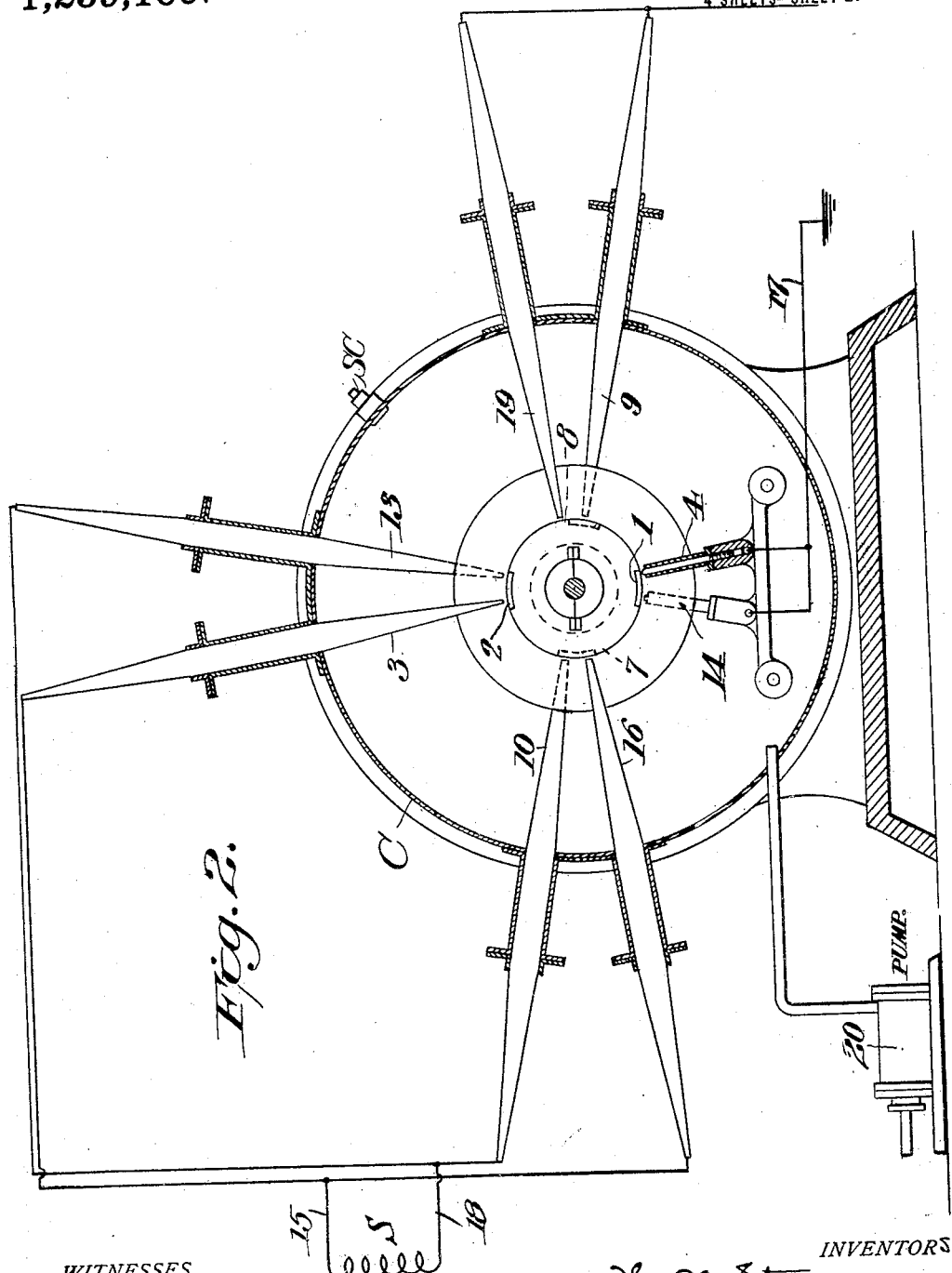

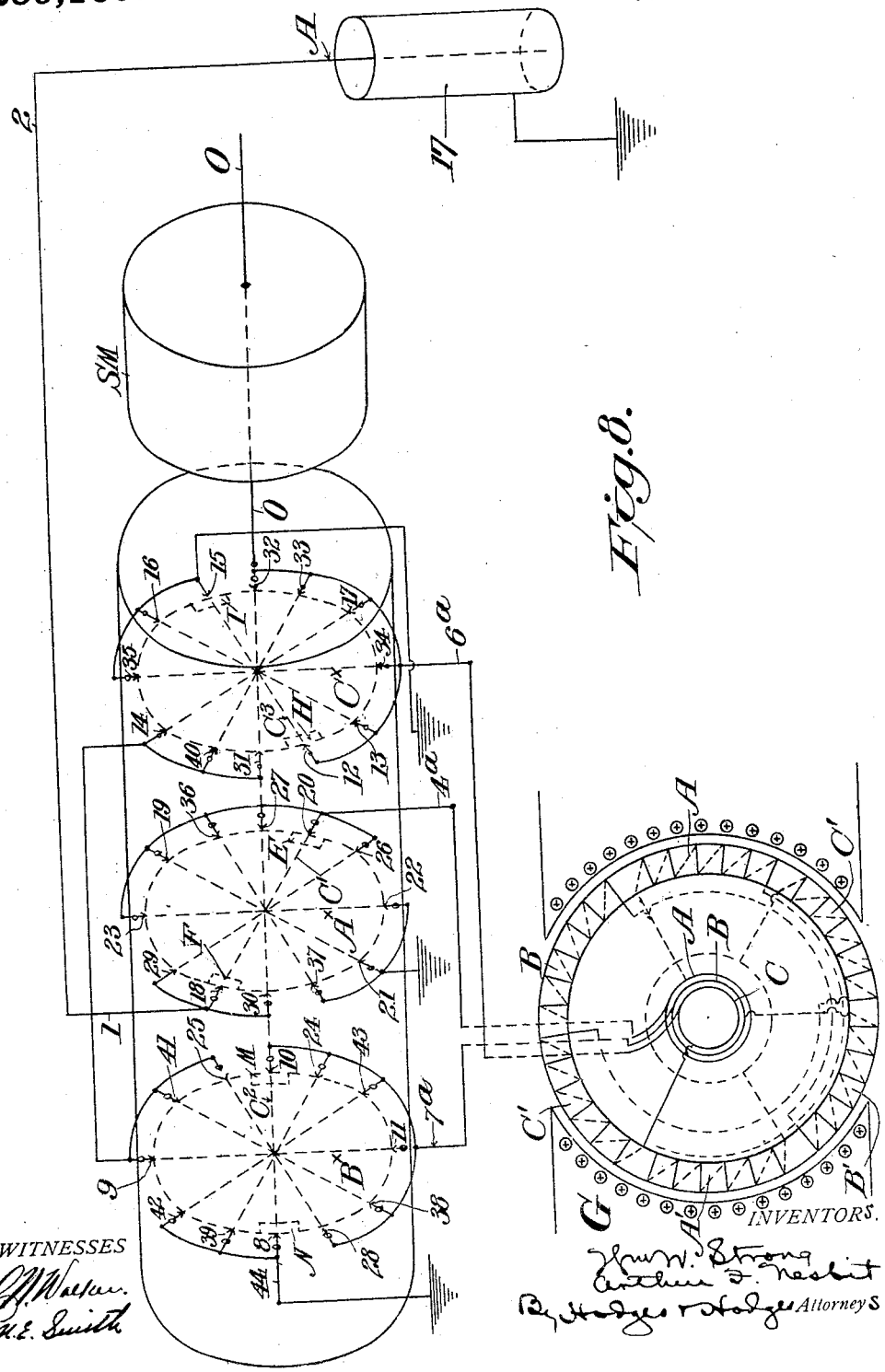

UNITED STATES PATENT OFFICE.

WILLIAM WALKER STRONG, OF PITTSBURGH, AND ARTHUR FLEMING NESBIT, OF WILKINSBURG, PENNSYLVANIA, ASSIGNORS TO R. B. MELLON, OF PITTSBURGH, PENNSYLVANIA.

APPARATUS FOR RECTIFYING HIGH-POTENTIAL ALTERNATING AND OSCILLATING CURRENTS AND ELECTROMOTIVE FORCES.

1,259,160. Specification of Letters Patent. Patented Mar. 12, 1918.

Application filed June 3, 1913. Serial No. 771,561.

*To all whom it may concern:*

Be it known that we, WILLIAM WALKER STRONG and ARTHUR FLEMING NESBIT, citizens of the United States, residing at Pittsburgh and Wilkinsburg, respectively, in the county of Allegheny and State of Pennsylvania, have invented new and useful Improvements in Apparatus for Rectifying High-Potential Alternating and Oscillating Currents and Electromotive Forces, of which the following is a specification.

This invention relates to an improved apparatus for rectifying high potential alternating and oscillating currents and electromotive forces. By "alternating and oscillating" is meant that the current or electromotive force may be either alternating or oscillating, or both.

Devices have heretofore been known and used for the purpose of rectifying high potential alternating and oscillating currents and electromotive forces that depend upon the use of commutators or disks having collecting points, rotated synchronously with the alternations of the high potential electromotive forces or currents, thereby permitting the rectification of a portion of the wave form. The term "rectification" is here used to designate the change of alternating or oscillating electromotive forces or currents to essentially unidirectional currents and essentially unipolar electromotive forces respectively. By the term "essential" is indicated the condition that all, or at least a very considerable part of the current is unidirectional and the electromotive force is approximately unipolar or constant in direction. The currents and electromotive forces may vary greatly in absolute value, however, and may include high frequency oscillations. Such rectifying devices have heretofore been operated in air under ordinary atmospheric pressure. It is also well known that when the potential of the various conducting parts is sufficiently high, brush and other discharges take place and these discharges may destroy the insulation and cause a deterioration of the commutator and the collecting points. On account of these brush and other discharges, aided by the accumulation or deposition of dust, and other foreign matter, upon the conducting parts, the danger of sparking and arcing over the insulating parts is considerable and it has been found necessary to make the insulating portions of high potential rectifying apparatus large, with the result that the rectifying device is bulky and cumbersome. Our invention has for its object to provide means for utilizing the different electrical properties of air and other gases at the same as or at other than atmospheric pressure, and at varying temperatures, whereby higher potential alternating currents and electromotive forces may be made use of without the formation of brush or other discharges about the edges and other parts of the conducting surfaces of the rectifier, thereby avoiding the danger of sparking and arcing over the insulating parts. A further object is to construct a rectifier of simple and compact form in which the working parts are protected from dirt, dust and other foreign matters and also to provide a rectifier capable of rectifying alternating and oscillating currents and electromotive forces of any number of phases.

The invention will be hereinafter fully set forth, and particularly pointed out in the claims.

In the accompanying drawings:

Figure 1 is a longitudinal sectional view of a rectifying apparatus constructed along the lines contemplated in our invention. Fig. 2 is a transverse sectional view thereof. Fig. 3 is a diagrammatic view illustrating the operation of a single phase rectifying and precipitating apparatus. Figs. 4 and 5 are diagrams illustrating an electromotive force or current wave of the sine form, and rectified portions thereof, respectively. Fig. 8 is a diagrammatic view of a three phase electromotive force and current rectifier. Figs. 6 and 7 are diagrams illustrating the waves before and after rectification.

Referring to the drawings, P and S, represent the primary and secondary coils, respectively, of a transformer T, operating upon alternating or oscillating current furnished by any suitable source, such as a generator G. Mounted in a gas tight case C supported upon a suitable base, is a shaft O operated by a synchronous motor S. M. Secured to the shaft O so as to rotate therewith are disks $D^1$ and $D^2$ of insulating material, the disk $D^1$ being provided with peripheral electrodes or commutator segments 1, 2 connected by a conductor C¹; the disk D² being provided with similar electrodes or commutator segments 7, 8, connected by a conductor C². It will be noted that the disks D', D² are separated by a larger disk D³ of insulating material, the said disks D', D² being interposed between the disk D³ and end disks D⁴. The effect of this arrangement is to provide annular grooves in which the segments 1, 2 and 7, 8 are located. Said disks D³ and D⁴ also serve to insulate the ends of pairs of collecting points or electrodes. One end of the secondary coil S is connected by a suitable wire with collecting members or electrodes 3, 16, and the other end of said coil is connected by a suitable wire with collecting members or electrodes 10, 13. The active electrode A of a precipitating apparatus is illustrated as connected by means of a wire with collecting members or electrodes 9, 19, and the grounded electrode 17 of said precipitating apparatus is connected by means of a suitable wire with the collecting members or electrodes 4, 14. It will be noted that the commutator segments or electrodes and the collecting members or electrodes are so supported with relation to each other that wiping contacts are avoided, an air space or gap being always maintained. The disks D¹ and D² are so secured to the shaft O that the electrodes or commutator segments 7, 8 of the disk D² are directly between the collecting members 9, 10 when the electromotive force is at its positive maximum value Fig. 4 and between the collecting members 13 and 14, as indicated in dotted lines, Fig. 3, when the electromotive force is at its negative maximum value, Fig. 4. Simultaneously the segments 7, 8 are between the collecting members 9 and 10 in one position and between collecting members 13 and 14 in the other position. Thus, in the form illustrated in Fig. 3 the shaft O turns a half revolution while the alternating electromotive force or current wave passes through a complete cycle. In the form of apparatus illustrated in said figure the commutator segments 1 and 2, and 7 and 8 are arranged at an angle of ninety degrees, but it is obvious that the position and number of these electrodes or segments depends upon, among other things, the rate of change of the alternations of the electromotive force or current, the angular speed of the shaft O and the number of phases of the alternating current. By reducing the required speed of the motor it will be necessary to increase the number of collecting members correspondingly. It will be observed that in the apparatus illustrated in Fig. 3, the electric charges on the active and grounded electrodes are of constant sign. In the position shown in full lines the current passes from 15 to 3, 2, 1, 4, A, 9, 10 to 18. When the commutator segments are in the dotted line positions, the current passes from 18 to 13, 14, A, 19, 16, to 15. From the foregoing it will be seen that the effect of the apparatus is to rectify the electromotive force or current wave illustrated in Fig. 4 so that the same assumes the form illustrated in Fig. 5. The angular width of the rectified portion of the electromotive force wave depends upon the angular width of the electrodes or collecting members and upon the size of the two conducting pairs of segments which are joined by the conductors C¹ and C².

In Fig. 3 the active electrode A is illustrated in the form of a wire or rod placed within the grounded electrode, which is in the form of a hollow cylinder, through which fluids containing suspended matter may be made to pass, and where chemical reactions may be effected, although it will be understood that we do not desire to limit ourselves in any of these particulars.

In order to maintain a suitable gas pressure within the case C, we provide a pump, conventionally illustrated and operated in any preferred manner, a suitable valve being provided to prevent reduction of pressure within said case while the pump is not in operation. By this arrangement a circulation of gas may be maintained by continuing the pump in operation, or the internal pressure in the chamber may be increased to the desired value and the approximate pressure maintained by any desired means. It is preferred to maintain a pressure and temperature of gas such that no brush discharge takes place within the case except when current is actually flowing between the rotating electrodes or commutator segments and the collecting members. The greater the pressure of the gas within the case C, the greater in general is the permissible reduction of the insulating distances of the inside parts of the rectifying apparatus. By inclosing the parts within the air tight case C they are protected from deposition of dust fumes, smoke, etc., and the use of a single disk for supporting the commutator segments or the electrodes, or the use of two disks as D¹ and D² in Fig. 2 simplifies and reduces the size of the apparatus. The use of a circular disk also reduces the windage resistance to a minimum. It is obvious that a gas may be used that will not be subjected to chemical changes by an electrical discharge as is produced in oxygen and nitrogen; illustrations of such gases being helium, neon, argon, krypton, etc. Under some conditions the more common gases are equally suitable. It is also apparent that a current of clean gas may be pumped through the case, thereby keeping the parts clean and cool, as may be desired.

For the purpose of rectifying a two phase alternating current or electromotive force, an apparatus similar to that illustrated in Fig. 3 may be employed by duplicating the disks $D^1$ and $D^2$ and the parts carried by each.

In Fig. 8 we have illustrated diagrammatically a form of apparatus for rectifying a three phase electromotive force and current, Figs. 6 and 7 illustrating diagrammatically, the waves before and after rectification. Referring to said Fig. 8 the generator G is star wound and a phase difference of 60° exists between the electromotive force induced in coils A and B; also coils B and C. It is obvious, however, that other forms of winding may be employed. A shaft O is mounted to rotate in suitable bearings and rigidly secured thereto are insulating disks $A^x$, $B^x$, $C^x$, said disks carrying rotating electrodes or commutator segments E—F, H—I and M—N, respectively. Each pair of commutator segments is connected by a conductor represented respectively at $C^1$, $C^2$ and $C^3$. The wire $4^a$ leading from coil A is provided with a plurality of collecting members or electrodes 23, 19, 36, 27, 20 and 26 arranged circumferentially adjacent to disk $A^x$. The lead wire $7^a$ from coil B is provided with a corresponding number of electrodes or collecting members 10, 24, 43, 11, 38 and 28, arranged circumferentially adjacent to the disk $B^x$; and the lead wire $6^a$ from the coil C is provided with a corresponding number of electrodes or collecting members 32, 33, 17, 34, 13 and 12, adjacent to disk $C^x$. The conductor 1—2 connected with the active electrode A is provided with a series of electrodes or collecting members 29, 18 and 30 arranged adjacent to disk $A^x$, a similar series 9, 41 and 25 adjacent to disk $B^x$, and a similar series 14, 40 and 31 adjacent to disk $C^x$. A plurality of grounded electrodes or collecting members 37, 21 and 22 is arranged adjacent to disk $A^x$, a similar series 8, 39 and 42 is arranged adjacent to disk $B^x$ and a similar series 15, 16 and 35 is arranged adjacent to disk $C^x$.

In order that the rectified portions of the electromotive force or current wave forms should be symmetrically situated with reference to the positive maximum and negative maximum value of the ordinates of the electromotive force or current waves given in Figs. 6 and 7, it is necessary that the proper angular relations should exist between the position of a reference mark on the shaft of the rectifier and a reference mark on the shaft of the synchronous motor which drives the rectifier. Thus the commutator segments E—F are arranged to lie between the electrodes or collecting members 18 and 20, the segments H—I are between the electrodes 12 and 15, and the segments M—N are between electrodes 8 and 10, when the current wave of generating coil A, Figs. 6 and 7 is a positive maximum; and between the points 19 and 21, 14 and 17, and 9 and 11, respectively when A is at a negative maximum. Similarly when the potential or current wave of generating coil B, Figs. 6 and 7 is at its positive and negative maximum values, the commutator segments E—F lie between electrodes 29 and 26, and 36 and 37, respectively; the electrodes H—I lie between the electrodes 31 and 32, and 34 and 35, respectively; and the segments M—N lie between the electrodes 29 and 34, and 38 and 41 respectively. In Figs. 6 and 7 the electromotive force or current waves are represented as sine waves. In general the electromotive force or current waves from high potential transformers approximate that of the sine form and it is under these conditions that their rectification is simplest in theory. It is, however, not necessary that these wave forms should be sine waves since for other periodic, alternating or oscillating wave forms proper placing of the synchronous motor, commutator segments, and collecting members or electrodes will result in the proper performance of the rectifying functions. In actual practice the wave forms are very much distorted both as regards electromotive force and current, this being brought about in any part by the variable gas resistance at the electrodes or collecting members. In the practical application, in order to obtain the best arrangement of the parts, it is necessary to get approximately sine wave forms of electromotive force and current which are at the same time most efficient for the purpose of the work to be effected, and then arrange the rectifier so as to effect this result. In a problem of this kind due regard must be given to phase relations between any given electromotive force and the current to which it gives rise. It is also obvious that under certain conditions these electromotive forces may have different frequencies.

It will be understood that while we have illustrated and described our improved rectifying apparatus as being utilized in connection with an apparatus for separating suspended matters from bodies containing the same, we do not desire to limit ourselves in this particular, as the same is applicable to many other forms of electrical apparatus.

Having thus explained the nature of our invention and described an operative manner of constructing and using the same, although without attempting to set forth all of the forms in which it may be made, or all of the forms of its use, what we claim is—

1. The combination with a source of alternating current, of a rotatable shaft, of commutator disks and insulating disks secured to said shaft in alternate arrangement, said commutator disks being provided with peripheral commutator segments electrically connected in groups, terminal members arranged opposite the respective commutator disks and spaced from the peripheries thereof, one terminal of said source of current being connected with a number of said terminal members, opposite one commutator disk and corresponding to the rate of change in the phase of the current to be rectified, the other terminal of said source being connected with a corresponding number of terminal members opposite the other commutator disks, collecting members arranged opposite to and spaced from the respective commutator disks, the number opposite each commutator disk corresponding to the rate of change in the phase of the current to be rectified, and means for electrically connecting the collecting members of each commutator disk with those of the other disk.

2. The combination with a source of alternating current, of a rotatable shaft, alternating disks of larger and smaller diameters secured to said shaft to form annular grooves, commutator segments secured within said grooves, and electrically connected in groups, terminal members projecting into said grooves opposite said segments but spaced therefrom, said terminal members being arranged in groups, the number of each group corresponding to the rate of change in the phase of the current to be rectified, there being one group of terminal members for each groove, the terminals of said current source being connected with the respective groups of terminal members, and groups of collecting members corresponding in number with said grooves, each group of collecting points comprising a number corresponding to the rate of change in the phase of the current to be rectified, said terminal members being spaced from said segments, and means for electrically connecting the respective groups of collecting members.

In testimony whereof we have hereunto set our hands in presence of two subscribing witnesses.

WILLIAM WALKER STRONG.
ARTHUR FLEMING NESBIT.

Witnesses:
ANDREW REINART,
W. J. MOORE.

Copies of this patent may be obtained for five cents each, by addressing the "Commissioner of Patents, Washington, D. C."